US011125334B2

(12) United States Patent
Ruggeri (10) Patent No.: US 11,125,334 B2
(45) Date of Patent: Sep. 21, 2021

(54) HYDRODYNAMIC SEALING COMPONENT AND ASSEMBLY

(71) Applicant: Eaton Corporation, Cleveland, OH (US)

(72) Inventor: Edward N. Ruggeri, Westport, MD (US)

(73) Assignee: Eaton Intelligent Power Limited, Dublin (IE)

( * ) Notice: Subject to any disclaimer, the term of this patent is extended or adjusted under 35 U.S.C. 154(b) by 133 days.

(21) Appl. No.: 15/849,025

(22) Filed: Dec. 20, 2017

(65) Prior Publication Data

US 2018/0172163 A1 Jun. 21, 2018

Related U.S. Application Data

(60) Provisional application No. 62/437,380, filed on Dec. 21, 2016.

(51) Int. Cl.
*F16J 15/34* (2006.01)

(52) U.S. Cl.
CPC ................................ *F16J 15/3412* (2013.01)

(58) Field of Classification Search
CPC .... F16J 15/3412; F16J 15/342; F16J 15/3424; F16C 33/107; F16C 33/1065
See application file for complete search history.

(56) References Cited

U.S. PATENT DOCUMENTS

| 3,383,116 | A | * | 5/1968 | Carter | F16J 15/3412 |
| | | | | | 277/385 |
| 3,499,653 | A | | 3/1970 | Gardner | |
| 3,782,737 | A | | 1/1974 | Ludwig et al. | |
| 3,804,424 | A | | 4/1974 | Gardner | |
| 3,822,068 | A | | 7/1974 | Litherland | |
| 4,082,296 | A | | 4/1978 | Stein | |
| 4,145,058 | A | | 3/1979 | Hady et al. | |
| 4,486,026 | A | | 12/1984 | Furumura et al. | |
| 4,705,277 | A | | 11/1987 | Repella | |
| 4,969,810 | A | | 11/1990 | Stolle et al. | |

(Continued)

FOREIGN PATENT DOCUMENTS

| DE | 8814442 U1 | 3/1990 |
| DE | 3901362 A1 | 7/1990 |

(Continued)

*Primary Examiner* — Eugene G Byrd
(74) *Attorney, Agent, or Firm* — Fishman Stewart PLLC (57) ABSTRACT

A hydrodynamic sealing component includes a land portion and a plurality of hydrodynamic grooves. The hydrodynamic sealing component may include sets of shallow grooves and deep grooves. In embodiments, the hydrodynamic sealing component may include alternating shallow grooves and deep grooves, or alternating pairs of shallow grooves and pairs of deep grooves. In embodiments, a hydrodynamic sealing component may include at least three sets of hydrodynamic grooves, wherein each set of hydrodynamic grooves may have a different depth, which may be configured to create or maintain hydrodynamic forces over a different operational range. In embodiments, a hydrodynamic sealing component may have a surface area of lands-to-grooves is 1:1 or less. A sealing assembly, which may include a rotor with hydrodynamic grooves on a sealing surface, is also disclosed.

23 Claims, 6 Drawing Sheets

(56) References Cited

U.S. PATENT DOCUMENTS

| | | | |
|---|---|---|---|
| 5,092,612 A | 3/1992 | Victor et al. | |
| 5,169,159 A | 12/1992 | Pope et al. | |
| 5,174,584 A | 12/1992 | Lahrman | |
| 5,180,173 A | 1/1993 | Kimura et al. | |
| 5,195,757 A | 3/1993 | Dahll, V | |
| 5,222,743 A | 6/1993 | Goldswain et al. | |
| 5,224,714 A | 7/1993 | Kimura et al. | |
| 5,368,314 A * | 11/1994 | Victor | F16J 15/3412 277/400 |
| 5,375,853 A | 12/1994 | Wasser et al. | |
| 5,398,943 A | 3/1995 | Shimizu et al. | |
| 5,454,572 A | 10/1995 | Pospisil | |
| 5,492,341 A | 2/1996 | Pecht et al. | |
| 5,496,047 A | 3/1996 | Goldswain et al. | |
| 5,509,664 A | 4/1996 | Borkiewicz | |
| 5,516,118 A | 5/1996 | Jones | |
| 5,529,315 A * | 6/1996 | Borrino | F16J 15/3484 277/352 |
| 5,558,341 A | 9/1996 | McNickle et al. | |
| 5,605,339 A | 2/1997 | Pecht et al. | |
| 5,700,013 A | 12/1997 | Baty | |
| 5,702,110 A | 12/1997 | Sedy | |
| 5,722,665 A | 3/1998 | Sedy et al. | |
| 5,941,532 A * | 8/1999 | Flaherty | F16J 15/363 277/399 |
| 5,947,481 A | 9/1999 | Young | |
| 5,952,080 A * | 9/1999 | Etsion | F16C 33/14 428/156 |
| 6,089,756 A | 7/2000 | Ono et al. | |
| 6,142,478 A * | 11/2000 | Pecht | F16J 15/3412 277/400 |
| 6,145,843 A | 11/2000 | Hwang | |
| 6,189,896 B1 | 2/2001 | Dickey et al. | |
| 6,213,473 B1 * | 4/2001 | Lebeck | F16J 15/342 277/387 |
| 6,257,589 B1 | 7/2001 | Flaherty et al. | |
| 6,446,976 B1 | 9/2002 | Key et al. | |
| 7,377,518 B2 | 5/2008 | Lai | |
| 7,500,676 B2 | 3/2009 | Tejima | |
| 7,770,898 B2 | 8/2010 | Dietle et al. | |
| 7,914,007 B2 | 3/2011 | Berard et al. | |
| 8,074,995 B2 | 12/2011 | Vasagar et al. | |
| 8,091,898 B2 * | 1/2012 | Garrison | F01D 25/183 277/399 |
| 8,100,403 B2 | 1/2012 | Short | |
| 8,162,322 B2 * | 4/2012 | Flaherty | F16J 15/3412 277/398 |
| 8,360,436 B2 | 1/2013 | Teshima et al. | |
| 8,474,826 B2 * | 7/2013 | Villeneuve | F16J 15/3444 277/377 |
| 8,757,632 B2 | 6/2014 | Dobosz et al. | |
| 9,062,775 B2 | 6/2015 | Short et al. | |
| 9,234,594 B2 | 1/2016 | Inoue et al. | |
| 9,494,239 B2 * | 11/2016 | Hosoe | F16J 15/3412 |
| 9,512,923 B2 | 12/2016 | Inoue et al. | |
| 9,970,478 B2 * | 5/2018 | Inoue | F16C 33/743 |
| 9,989,153 B2 * | 6/2018 | Colombo | F16J 15/3412 |
| 10,247,194 B2 * | 4/2019 | Goldswain | F16J 15/342 |
| 2002/0074728 A1 | 6/2002 | Kraus | |
| 2003/0189294 A1 | 10/2003 | Tejima | |
| 2005/0094906 A1 | 5/2005 | Satoh | |
| 2008/0042364 A1 | 2/2008 | Zheng et al. | |
| 2008/0272552 A1 | 11/2008 | Zheng et al. | |
| 2008/0284105 A1 | 11/2008 | Vasagar et al. | |
| 2009/0279817 A1 | 11/2009 | Shimizu et al. | |
| 2009/0297077 A1 | 12/2009 | Nii et al. | |
| 2011/0101616 A1 | 5/2011 | Teshima et al. | |
| 2012/0280456 A1 * | 11/2012 | Young | F16J 15/3412 277/400 |
| 2014/0117625 A1 * | 5/2014 | Short | F16J 15/3448 277/408 |
| 2015/0042045 A1 | 2/2015 | Inoue et al. | |
| 2015/0084286 A1 | 3/2015 | Inoue et al. | |
| 2015/0097341 A1 | 4/2015 | Inoue et al. | |
| 2015/0123350 A1 | 5/2015 | Itadani et al. | |
| 2015/0275684 A1 | 10/2015 | Thatte et al. | |
| 2016/0097456 A1 * | 4/2016 | FitzGibbon | F16J 15/3412 |
| 2016/0208924 A1 * | 7/2016 | Ruggeri | F16J 15/3408 |
| 2017/0370472 A1 | 12/2017 | Ruggeri | |
| 2018/0010690 A1 | 1/2018 | Itadani et al. | |
| 2018/0058502 A1 | 3/2018 | Hosoe et al. | |
| 2018/0172162 A1 * | 6/2018 | Tokunaga | F16J 15/34 |

FOREIGN PATENT DOCUMENTS

| | | |
|---|---|---|
| DE | 29601165 U1 | 3/1996 |
| DE | 19722870 A1 | 6/1998 |
| DE | 29818004 U1 | 12/1998 |
| EP | 0992723 A2 | 4/2000 |
| EP | 1302709 A2 | 4/2003 |
| JP | H0450559 A | 2/1992 |
| JP | H05164249 A | 6/1993 |
| JP | 2008296407 A | 12/2008 |
| WO | 9214080 A1 | 8/1992 |
| WO | 9506211 A1 | 3/1995 |
| WO | 0166982 A1 | 9/2001 |
| WO | 02093046 A1 | 11/2002 |
| WO | 2004053365 A1 | 6/2004 |
| WO | 2013006560 A1 | 1/2013 |

* cited by examiner

HYDRODYNAMIC SEALING COMPONENT AND ASSEMBLY

CROSS-REFERENCE TO RELATED APPLICATION

This application claims the benefit of priority to U.S. Provisional Application No. 62/437,380, filed Dec. 21, 2016, the entire disclosure of which is incorporated herein by reference.

TECHNICAL FIELD

The present disclosure relates generally to seals and sealing systems, including hydrodynamic seals and assemblies. Such seals and sealing systems may, without limitation, be suitable for face seal applications associated with rotating shafts, and/or for preventing fluids from leaking from one side of a seal to another (e.g., a liquid side of a seal to a gas side of the seal).

BACKGROUND

Seals and sealing assemblies may be used in connection with contacting and hydrodynamic configurations. Such seals may provide a barrier between an air compartment and a bearing compartment that contains oil and/or other fluid, among other applications.

With aerospace applications, engine manufacturers commonly seek extended service life from sealing systems. As part of that objective, some sealing systems involve hydrodynamic sealing technology. With aerospace applications, operation can be associated with ground or sea level and high altitude. The difference in altitude can, however, involve a wide operational range of source pressures that feed the system—e.g., from about 90 psia to near 0 psia. The source pressure can, inter alia, aid in driving a working fluid into associated hydrodynamic grooves so that there is sufficient volume of a working fluid to create a hydrodynamic effect (e.g., a film). As source pressure is reduced, such as at increased altitude, the amount of working fluid that enters the hydrodynamic grooves may be reduced.

In a number of aerospace applications, hydrodynamic seals will primarily wear in connection with initial engine start up and shutdown, as those are the time periods in which the sealing interfaces are in contact. To reduce wear and tear, it is desirable for a seal to provide a hydrodynamic film between a sealing interface (e.g., between a stator and a rotor) as soon as possible during engine start-up and for the interface to remain non-contacting or a materially reduced contact load during the entire mission/operation cycle of the engine. During engine shutdown cycle, it is desirable to maintain the hydrodynamic film to the lowest rotations-per-minute (rpm) and/or to reduce contact load to help minimize seal wear during engine shutdown.

Shallow hydrodynamic grooves may create a hydrodynamic film at fairly low rotational speeds, provided that there is a sufficient amount of source pressure available to drive a working fluid into the hydrodynamic grooves (a situation typical for engine startup at sea level). However, as the source pressure is reduced, such as at high altitude conditions (which are commonly experienced with aerospace applications), a seal's ability to maintain a sufficient hydrodynamic film during operation (i.e., to prevent sealing interfaces from contact) is reduced. That is generally due to a reduced volume of working fluid entering the hydrodynamic grooves as a result of lower source pressure. Sealing interface contact during such conditions can reduce seal life and, in some instances, damage can occur to the hydrodynamic grooves, which can further compromise a seal's ability to produce hydrodynamic film for a seal interface.

Deep hydrodynamic grooves can provide a sufficient volume of a working fluid to a hydrodynamic groove during time periods with reduced source pressure, and can help avoid sealing interface contact. However, deep hydrodynamic grooves can cause liftoff speeds (e.g., speed in which a hydrodynamic film is formed) to increase. And, an additional volume of the hydrodynamic groove can result in lower working fluid velocity within the hydrodynamic groove, which can require higher rotor speeds to create the hydrodynamic film (such as would replicate the working fluid velocity of shallow hydrodynamic grooves). Such higher speeds to create hydrodynamic film can result in increased seal wear during engine startup than would be associated with shallow hydrodynamic grooves. Moreover, during engine shutdown cycle, hydrodynamic film may be lost at higher rotor speeds due to the deep hydrodynamic grooves and can result in more seal wear than with shallow hydrodynamic grooves.

For many conventional embodiments, a seal with hydrodynamic grooves may be provided with one type of grooves with a depth that may handle a range of operation well, but may be less desirable at certain operational conditions. Therefore, it may be desirable for a seal with hydrodynamic grooves of different depths that is capable of covering a wide range of operational conditions ranging from sea level to high altitude and low pressure.

SUMMARY

A hydrodynamic sealing component includes a land portion and a plurality of hydrodynamic grooves. In embodiments, a sealing component may comprise a rotor, a stator, or other sealing assembly component. The hydrodynamic sealing component may include a plurality of grooves, including sets of shallow grooves and deep grooves. In embodiments, the hydrodynamic sealing component may include alternating shallow grooves and deep grooves, or alternating pairs of shallow grooves and pairs of deep grooves. In embodiments, a hydrodynamic sealing component may include at least three sets of hydrodynamic grooves, wherein each set of hydrodynamic grooves may have a different depth, which may be configured to create or maintain hydrodynamic forces over a different operational range. In embodiments, a hydrodynamic sealing component may have a surface area of lands-to-grooves is 1:1 or less. A sealing assembly, which may include a rotor with hydrodynamic grooves on a sealing surface is also disclosed.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments, it will be understood that they are not intended to limit the disclosure to these embodiments. On the contrary, the disclosure is intended to cover alternatives, modifications, and equivalents, which may be included within the spirit and scope of the disclosure.

Aerospace engine manufacturers seek extended service life from sealing systems. Employing hydrodynamic sealing technology can often help meet this need.

Aerospace engines often operate both at sea level and at high altitude environments in which source pressure that feeds the sealing system can vary significantly, such as from about 90 psia to near zero psia. The source pressure may aid in driving the working fluid into the hydrodynamic grooves such that there is sufficient volume of working fluid to create a sufficient/consistent hydrodynamic film (e.g., between a rotor and a stator). As the source pressure is reduced, the amount of working fluid entering the hydrodynamic grooves may also be reduced.

Hydrodynamic seals typically wear most/only during initial engine start-up and shutdown, as that may be the time period the sealing interfaces (e.g., of a rotor and stator) are in contact. To reduce wear, the seal may create a hydrodynamic film between the sealing interfaces (e.g., a stator and a rotor) as soon as possible during engine start-up and then may remain in a non-contact condition more significantly during the entire mission cycle of the engine. During engine shutdown cycle, the hydrodynamic film may be maintained even at lower rotations per minute, which may include the lowest possible rpm (of the engine), to help minimize seal wear during engine shutdown.

Typically, shallow hydrodynamic grooves can create a hydrodynamic film at fairly low speeds provided there is a reasonable source pressure available to drive the working fluid into the hydrodynamic grooves. This may represent a common situation for engine start-up at sea level. However, as the source pressure is reduced, such as at high altitude conditions, the seal's ability to maintain a sufficient hydrodynamic film during operation to prevent sealing interfaces from contacting may also be reduced. This may be due to the reduction of volume of working fluid entering the hydrodynamic grooves as a result of the low source pressure.

Sealing interface contact during this time period can reduce (perhaps even significantly) the seal life and, in some instances, may damage the hydrodynamic grooves, which may compromise the seal's ability to create a hydrodynamic film.

Deep hydrodynamic grooves can help facilitate a sufficient volume of working fluid entering the hydrodynamic grooves during time periods of reduced source pressures to help avoid sealing interface contact. However, deep hydrodynamic grooves can also cause liftoff speeds (speed at which a hydrodynamic film is formed) to increase. The additional volume of the hydrodynamic groove may result in lower working fluid velocity within the hydrodynamic groove, which may require higher rotor speeds to create the hydrodynamic film that replicates the working fluid velocity of the shallow hydrodynamic grooves. Such higher rotational speeds for creating the hydrodynamic film via deep grooves may results in more seal wear during engine start-up than with shallow hydrodynamic grooves.

During the engine shutdown cycle, the hydrodynamic film may be lost at higher rotor speeds due to the deep hydrodynamic grooves, which may result in more seal wear than with shallow hydrodynamic grooves.

In embodiments, a seal may include a combination of shallow and deep hydrodynamic grooves (also referred to as shallow grooves and deep grooves) within the same rotor, which may allow for the hydrodynamic film to be generated at low rotor speeds and maintained at very low source pressures.

Figures 1, 1A:
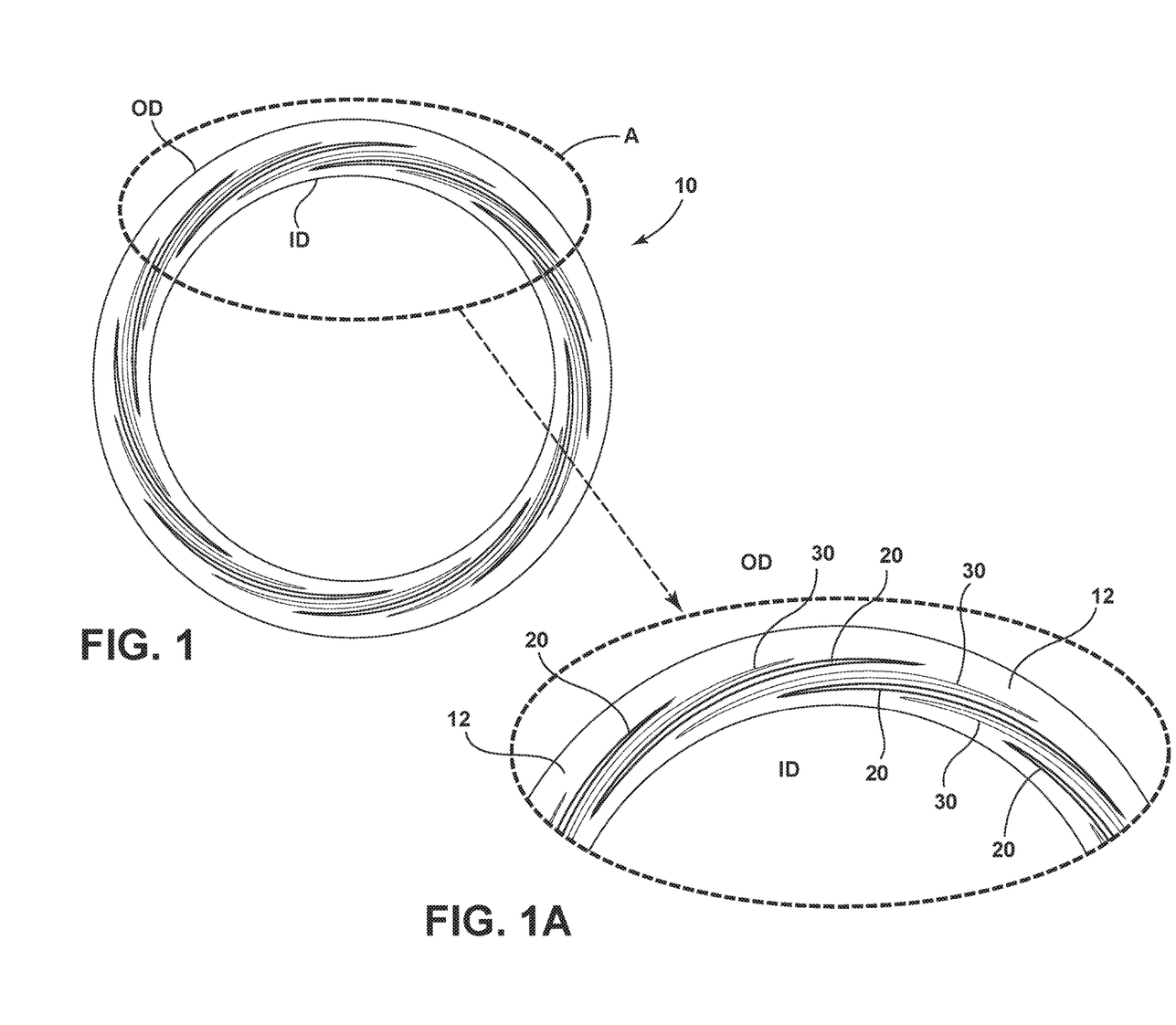
FIG. 1 is a top view of an embodiment of a sealing component in accordance with aspects and teachings of the present disclosure.
FIG. 1A is an enlarged view of portion A of FIG. 1.
Figures 3, 3A:
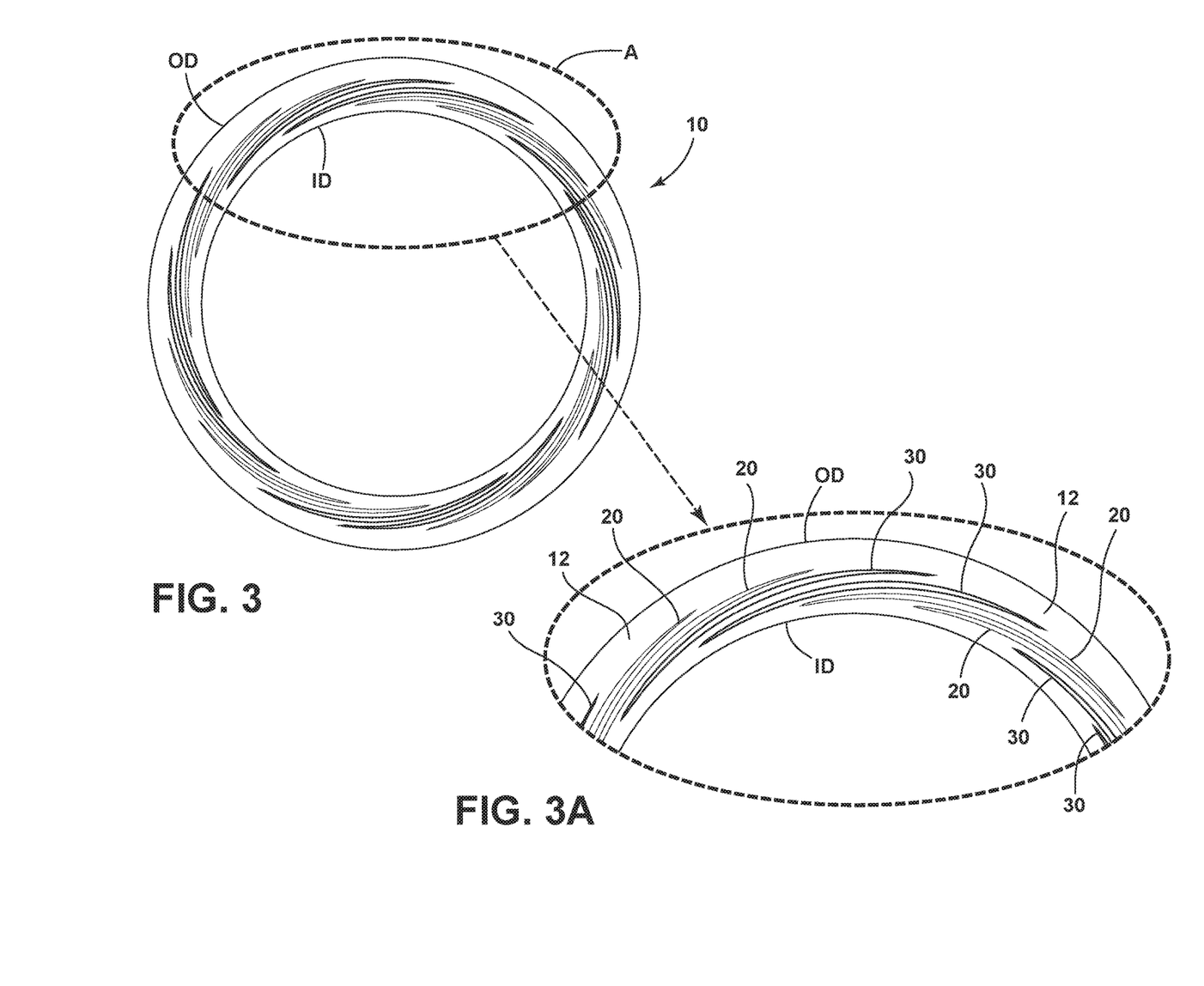
FIG. 3 is a top view of another embodiment of a sealing component in accordance with aspects and teachings of the present disclosure.
FIG. 3A is an enlarged view of portion A of FIG. 3.

In embodiments, the hydrodynamic groove depths for each groove can be positioned in an alternating pattern of a single groove format (e.g., as generally illustrated in FIG. 1) or in groups (e.g., as generally illustrated in FIG. 3) such that a substantially uniform liftoff force may be provided around the circumference of the rotor regardless of the source pressure.

With reference to FIGS. 1 and 1A, an embodiment of a sealing component 10 (e.g., a rotor) and a portion thereof are generally illustrated. While the sealing component may comprise a rotor, including rotors such as generally illustrated herein, a sealing component could also comprise a stator or other sealing assembly component. As generally shown, a sealing component 10 may include land portions (or lands 12) and a combination of shallow hydrodynamic grooves (shallow grooves 20) and, at least comparatively, deep hydrodynamic grooves (deep grooves 30). In embodiments, the shallow grooves 20 and deep grooves 30 may alternate around a circumference of the sealing component face (shown in top plan view). In embodiments, such as generally shown in FIG. 1, grooves 20,30 may not extend all the way to an outer diameter OD of the sealing component or all the way to an inner diameter ID of the sealing component.

Figure 2:
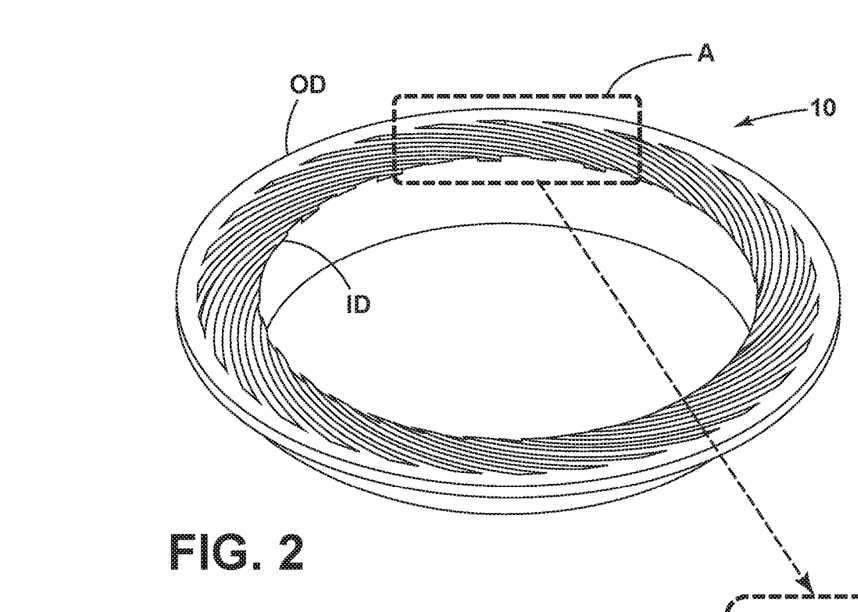
FIG. 2 is a perspective view of an embodiment of a sealing component in accordance with aspects and teachings of the present disclosure.
Figure 2A:
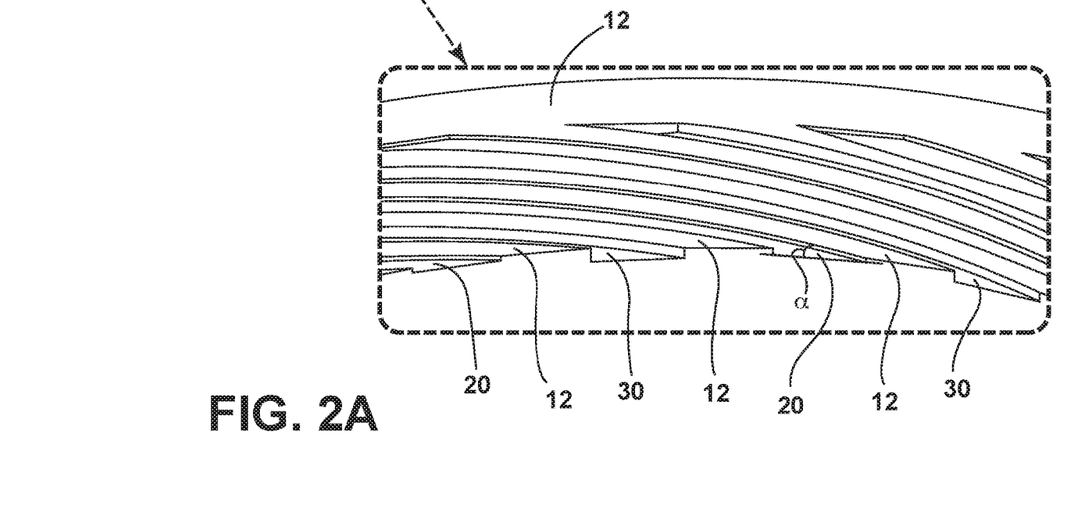
FIG. 2A is an enlarged view of portion A of FIG. 2.

FIGS. 2 and 2A generally illustrate another embodiment of a sealing component 10 and a portion thereof with an alternating configuration of shallow grooves 20 and deep grooves 30 provided adjacent lands 12. As generally shown in FIGS. 2 and 2A, the shallow grooves 20 and deep grooves 30 may be offset radially inward, at least to a degree, from an outer diameter OD of the seal, and the grooves 20,30 may extend substantially to (or even all the way to) an inner diameter ID of the sealing component (see, e.g., FIG. 2).

With reference to FIGS. 3 and 3A, another embodiment of a sealing component 10 and a portion thereof are generally illustrated. As generally shown, a sealing component 10 may include land portions (or lands 12) and a combination of shallow grooves 20 and, at least comparatively, deep grooves 30 that are configured, for example, in alternating pairs around a circumference of the sealing component face (shown in top plan view). In embodiments, such as generally shown in FIG. 3, grooves 20,30 may not extend all the way to an outer diameter OD of the sealing component or all the way to an inner diameter ID of the sealing component.

Figures 4, 4A:
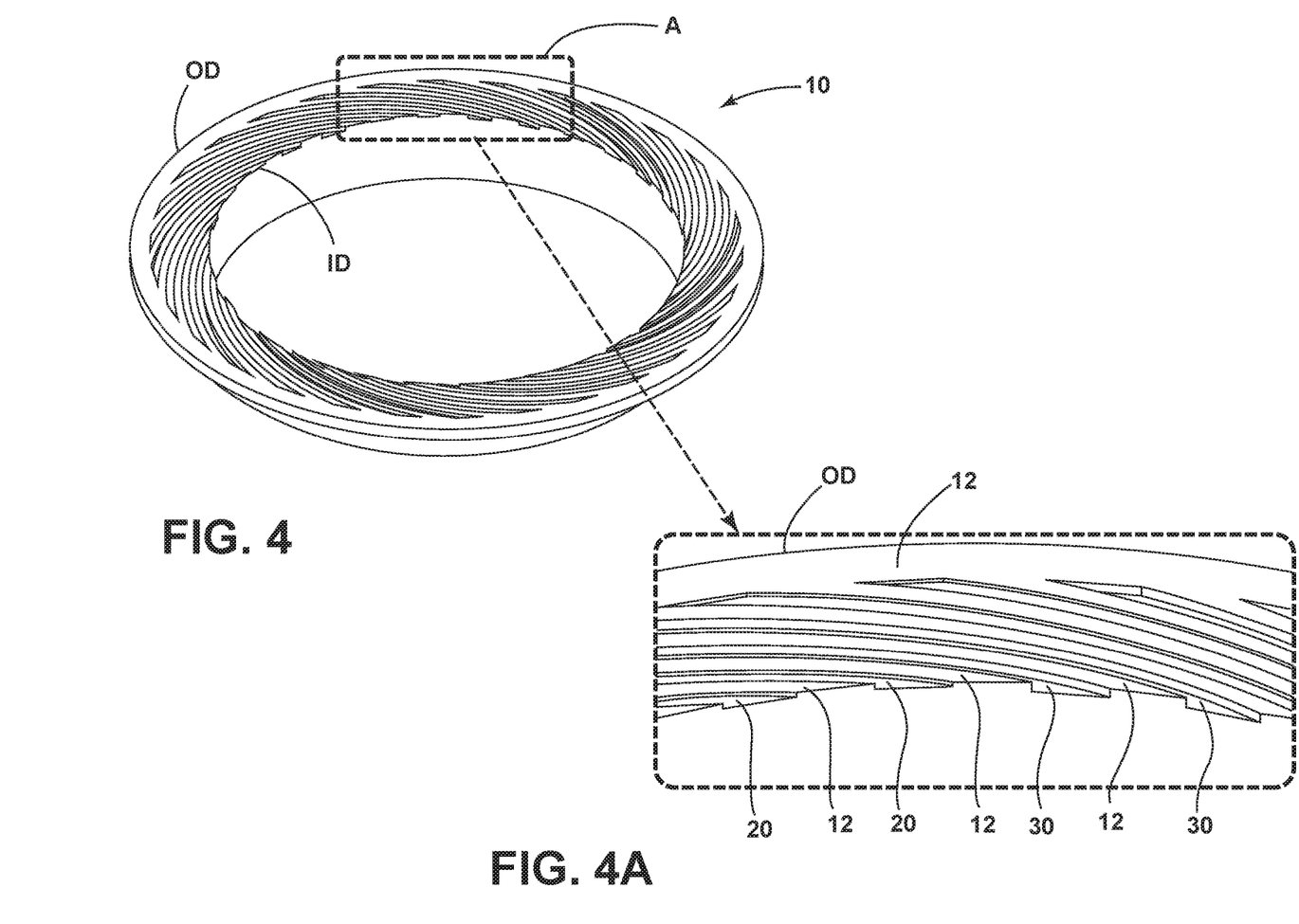
FIG. 4 is a perspective view of an embodiment of a sealing component in accordance with aspects and teachings of the present disclosure.
FIG. 4A is an enlarged view of portion A of FIG. 4.

FIGS. 4 and 4A generally illustrate another embodiment of a sealing component 10 and a portion thereof with an alternating pair configuration of shallow grooves 20 and deep grooves 30 provided adjacent lands 12. As generally shown in FIGS. 4 and 4A, the shallow grooves 20 and deep grooves 30 may be offset radially inward, at least to a degree, from an outer diameter OD of the seal, and the grooves 20,30 may extend substantially to (or even all the way to) an inner diameter ID of the sealing component (see, e.g., FIG. 4).

Figure 5:
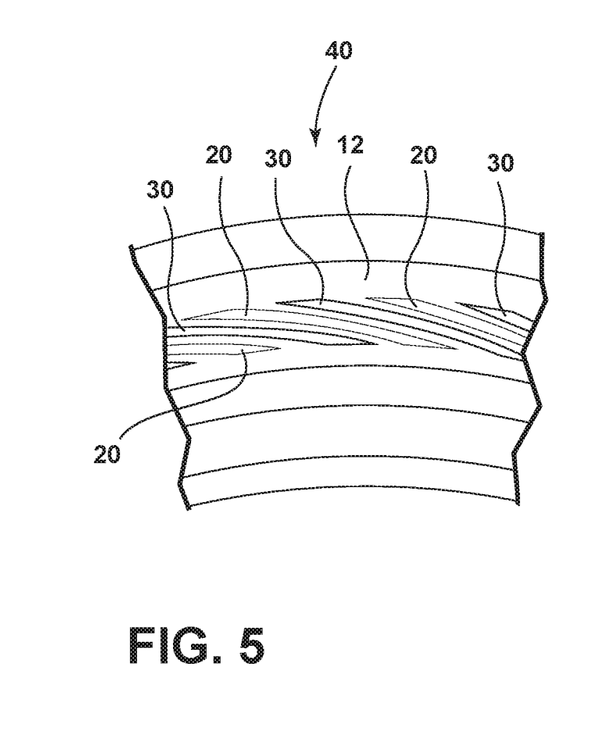
FIG. 5 includes a side view of a portion of an embodiment of a rotor of a seal assembly, the rotor including hydrodynamic grooves in accordance with aspects and teachings of the present disclosure.

FIG. 5 generally illustrates a side view of a portion of an embodiment of a rotor 40 with hydrodynamic grooves on a sealing surface. In the illustrated embodiment, the shallow grooves 20 and deep grooves 30 are shown in an alternating configuration with lands 12 disposed therebetween.

Figure 6:
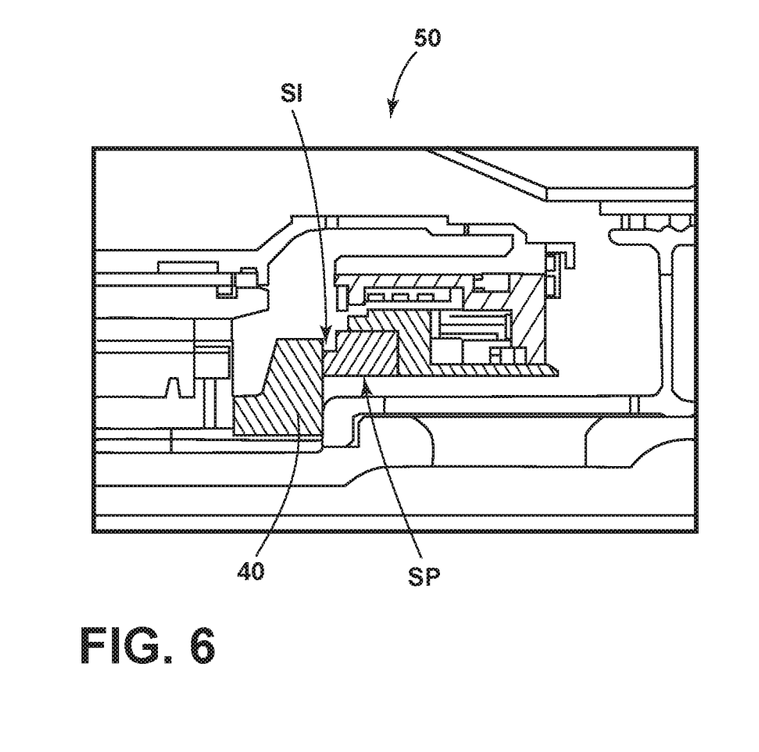
FIG. 6 is a side cross-sectional view of portions of an embodiment of a sealing assembly, including a rotor with hydrodynamic grooves, a stator, and a sealing interface, in accordance with aspects and teachings of the present disclosure.

FIG. 6 generally illustrates a sealing assembly 50 that includes a rotor 40 with hydrodynamic grooves on a sealing surface, and wherein an inner diameter pressure is greater than an outer diameter pressure. Although it is noted that the sealing assembly could be configured such that an outer diameter pressure is greater than an inner diameter pressure via inward pumping grooves. With continued reference to FIG. 6, a sealing interface SI is generally shown, along with a rotor 40 having hydrodynamic grooves 20,30 provided at or about the sealing interface. Additionally, a source pressure SP may be provided (e.g., at or about where indicated) to provide inner diameter outward pumping grooves.

Figure 7:
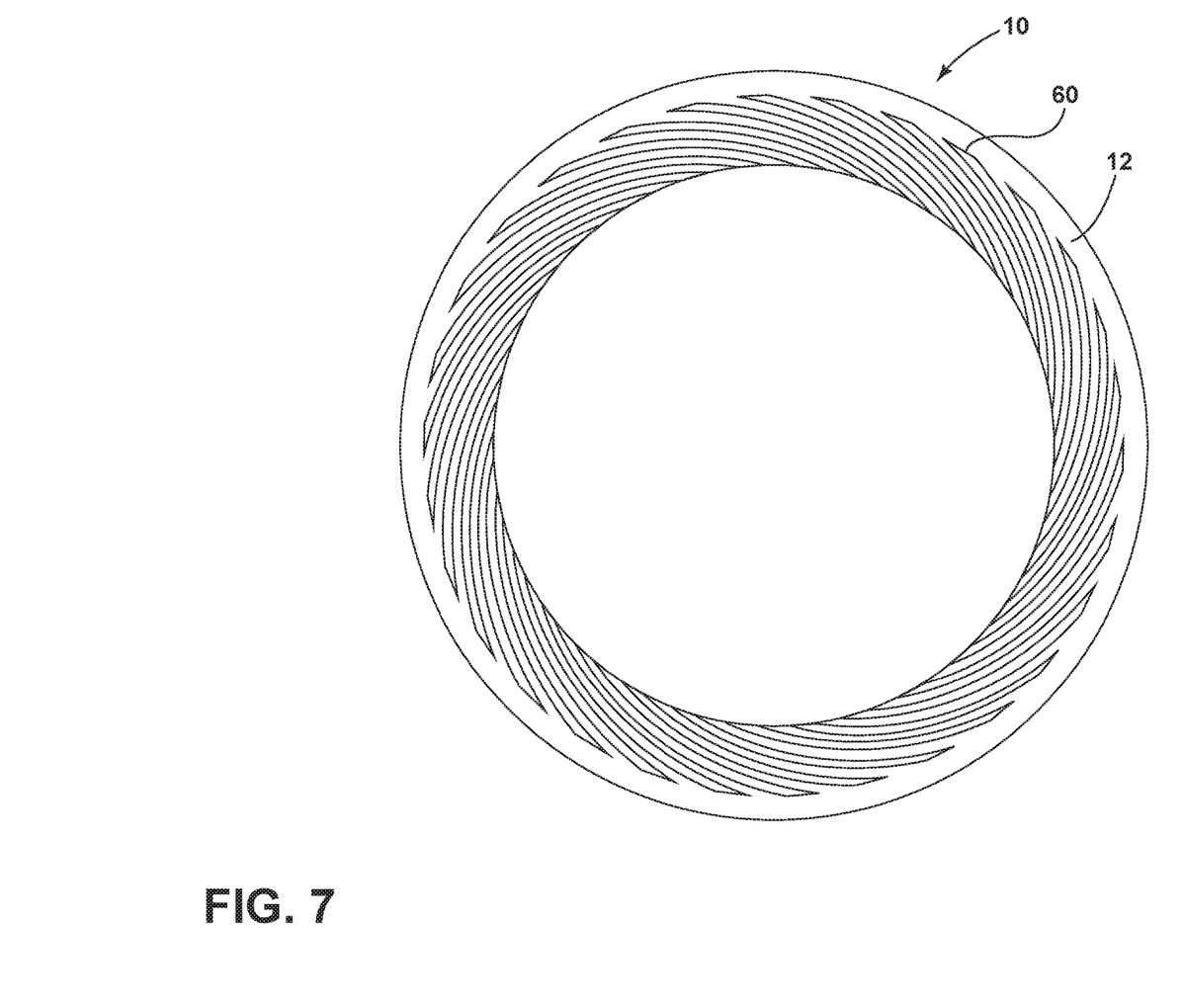
FIG. 7 is a top view of an embodiment of a sealing component in accordance with aspects and teachings of the present disclosure.

FIG. 7 generally illustrates an embodiment of a sealing component 10 in accordance with aspects and teachings of the present disclosure. As generally illustrated, the sealing component includes land portions (or lands 12) and a plurality of hydrodynamic grooves 60 disposed adjacent the lands 12. The hydrodynamic grooves 60 may comprise one type of hydrodynamic groove (e.g., grooves having a substantially consistent depth), or multiple types of hydrodynamic grooves (e.g., grooves having different depths).

In embodiments, each hydrodynamic groove or series/group of hydrodynamic grooves (e.g., alternating (e.g., FIGS. 1, 1A, 2, 2A), alternating-paired (e.g., FIGS. 3, 3A, 4, 4A), etc.) can be tailored by varying the depth to meet specific operating conditions.

For example and without limitation, for some aerospace gas turbine applications, shaft speeds can be as low as 10,000 rpm and up to 100,000 rpm, and may operate from sea level to sub-ambient conditions (which can be below atmospheric pressure). Hydrodynamic grooves utilized for such applications may vary in depth, for example and without limitation, from about 0.000425 in. to about 0.000080 in. However, the shallower groove depths can create a hydrodynamic film sooner than deeper groove depths. In aerospace applications, shallower grooves can function more efficiently than grooves deeper than about 0.001 in., which may have trouble functioning at all in higher altitude conditions. That is, shallower groove depths may be better suited for ambient and high pressure conditions, and perhaps lower rotational speed.

For a number of embodiments, the depth of the hydrodynamic groove would not be deeper that 0.001 in. Moreover, for a number of embodiments, the depth would be about 0.0003 in. Additionally, with respect to the comparatively shallower grooves, in embodiments the shallower grooves would be about 0.00035 in. to about 0.00040 in. Consequently, in embodiments, the deeper grooves may be comparatively deep, but need not be as deep as with some conventional seals, and the comparatively shallower grooves may be a little deeper than with some conventional seals.

Embodiments of seals can have a desired ratio of lands and grooves with respect to surface area. In embodiments the ratio of surface area of lands-to-grooves may be 1:1 or less. For example, in an embodiment, the ratio of surface area for lands-to-grooves may be about 0.75:1 or less. This can be in stark contrast with some conventional seals, which commonly have a greater surface area of lands-to-grooves. An increased groove density on the surface of a seal may, among other things, help to prevent contact events, which may result in extended seal life.

Additionally, some conventional seals include a groove that extends entirely across the sealing surface—e.g., to serve as a cleaning groove. However, for a number of embodiments, including those for aerospace applications, grooves that extend across the sealing surface would not be included and, for many circumstances, may be operationally detrimental.

Depending on the intended or anticipated operating range of an engine, several groups of hydrodynamic groove depths can be employed in a configuration to create or maintain a hydrodynamic film for an interface. In addition, other structural modifications to a series of grooves can be utilized such as at depth inlets to enhance a volume of working fluid entering the hydrodynamic groove for a given condition, such as a hydrodynamic rotor coning as a result of a transient condition.

In addition, special features of the hydrodynamic groove inlet such as tapering (see, e.g., FIGS. 1A, 3A, 7) can enhance hydrodynamic groove filling of the working fluid to increase the hydrodynamic film thickness.

A sealing component with at least one shallow groove and at least one deep groove may be configured for use in environments in which fluid pressure is greater at an inner diameter of the sealing component than at the outer diameter of the sealing component and/or for use in environments in which fluid pressure is greater at an outer diameter of the sealing component than at the inner diameter of the sealing component.

The instant concept can be employed to reduce contact loading at a sealing interface when engine speeds are reduced at sub-ambient conditions (e.g., flight idle at altitude). With such conditions maintaining a hydrodynamic film can be challenging, and a collapse of hydrodynamic film could cause a touchdown event, which could damage a seal and hydrodynamic rotor. With the inclusion of a series of hydrodynamic grooves that are configured for such a condition (and range of conditions in service) can, among other things, reduce seal loading at a sealing interface, which can avoid damage to a seal or hydrodynamic rotor.

In embodiments, two or more sets of hydrodynamic grooves having different depths may be included to address different ranges across an operational spectrum. For example and without limitation, a set of hydrodynamic grooves may be included with depths intended to address two or more of the following aerospace operational conditions/parameters:

(a) initial liftoff condition;
(b) cruise condition;
(c) flight idle condition; and
(d) climb condition.

Additionally, in embodiments the hydrodynamic grooves may be configured such that the hydrodynamic forces may remain substantially constant throughout the operational profile.

In embodiments, the angles associated with the grooves may be comparatively shallow, and may extend to a more extensive degree around the circular sealing component surface. For example and without limitation, the grooves may be provided at an angle (e.g., an angle coming off an inner diameter ID, see, e.g., angle α in FIG. 2A) that is less than about 15°, may be less than about 10°, and may be less than about 8°. With some embodiments, the angle may be about 8° or may be about 8°±2°. Moreover, with embodiments the grooves at least one set of grooves may extend around (e.g. circumferentially around) the circular face of the sealing component for more than 60°, and for some embodiments at least one set of grooves may extend more than 72°. With grooves that have a comparatively lower angle such as noted, and are comparatively longer (e.g., by extending further circumferentially), a longer associated groove length can, inter alia, be used to build up and/or maximize pressure.

By employing multiple sets of hydrodynamic grooves from shallow to deep on the same rotor, a hydrodynamic film can be generated at low rotor speeds and can be maintained at higher speeds with very low source pressure (such as at sub-ambient conditions).

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification, but that the scope of the present disclosure will include any embodiments falling within the foregoing description and the appended claims.

What is claimed is:

1. A hydrodynamic sealing component, comprising:
   a land portion; and
   at least three sets of hydrodynamic grooves, each set of hydrodynamic grooves having a different depth and extending around at least a portion of a circumference of a sealing face;
   wherein the hydrodynamic grooves extend to an inner diameter edge of the hydrodynamic sealing component; the hydrodynamic grooves include a first set of shallow grooves, a second set of deep grooves, and a third set of grooves; and the shallow grooves have a depth that is less than the depth of the deep grooves.

2. The hydrodynamic sealing component of claim 1, wherein the shallow grooves and deep grooves alternate around a circumference of a face of the hydrodynamic sealing component.

3. The hydrodynamic sealing component of claim 1, wherein the shallow grooves and the deep grooves are offset radially inward from an outer diameter of the hydrodynamic sealing component.

4. The hydrodynamic sealing component of claim 1, wherein the shallow grooves and the deep grooves are provided at an angle coming off the inner diameter edge that is less than about 15 degrees.

5. The hydrodynamic sealing component of claim 2, wherein the shallow grooves and the deep grooves are offset radially inward from an outer diameter of the hydrodynamic sealing component.

6. The hydrodynamic sealing component of claim 1, wherein the hydrodynamic grooves alternate in sets of three around a circumference of the hydrodynamic sealing component, with each of the sets of three hydrodynamic grooves comprising one of the first set of shallow grooves, one of the second set of deep grooves, and one of the third set of grooves.

7. The hydrodynamic sealing component of claim 6, wherein the shallow grooves and the deep grooves are offset radially inward from an outer diameter of the hydrodynamic sealing component.

8. The hydrodynamic sealing component of claim 1, wherein the shallow grooves and the deep grooves are provided at an angle coming off the inner diameter edge that is about 8 degrees±2 degrees.

9. The hydrodynamic sealing component of claim 1, wherein at least one of the shallow grooves and the deep grooves have a substantially consistent depth.

10. The hydrodynamic sealing component of claim 1, wherein the shallow grooves and the deep grooves have depths within a range of about 0.000425 in. to about 0.000080 in.

11. The hydrodynamic sealing component of claim 1, wherein a maximum depth of the deep grooves is about 0.001 in. or less.

12. The hydrodynamic sealing component of claim 1, wherein the depth of the shallow grooves is about 0.0003 in.

13. The hydrodynamic sealing component of claim 1, wherein the depth of the shallow grooves is about 0.00035 in. to about 0.00040 in.

14. The hydrodynamic sealing component of claim 1, wherein at least some of the hydrodynamic grooves include a tapered portion.

15. The hydrodynamic sealing component of claim 1, wherein at least one of the shallow grooves or the deep grooves extends more than 60° circumferentially around a face of the hydrodynamic sealing component.

16. The hydrodynamic sealing component of claim 1, wherein at least one of the shallow grooves or the deep grooves extends more than 72° circumferentially around a face of the hydrodynamic sealing component.

17. The hydrodynamic sealing component of claim 1, wherein at least one of the shallow grooves and the deep grooves are provided at an angle coming off an inner diameter that is less than about 15°.

18. The hydrodynamic sealing component of claim 1, wherein at least one of the shallow grooves and the deep grooves are provided at an angle coming off an inner diameter that is less than about 10°.

19. The hydrodynamic sealing component of claim 1,
wherein a ratio of surface area of lands-to-grooves is 1:1 or less.

20. The hydrodynamic sealing component of claim 19, wherein ratio of surface area of lands-to-grooves is 0.75:1 or less.

21. A hydrodynamic sealing component, comprising:
a land portion;
at least three sets of hydrodynamic grooves, each set of hydrodynamic grooves having a different depth and extending around at least a portion of a circumference of a sealing face;
wherein the hydrodynamic grooves extend to an inner diameter edge of the hydrodynamic sealing component.

22. The hydrodynamic sealing component of claim 21, wherein the depth of each set of hydrodynamic grooves is configured to create or maintain hydrodynamic forces over a different operational range.

23. The hydrodynamic sealing component of claim 1, wherein the shallow grooves and deep grooves have substantially the same length.

* * * * *